United States Patent
Shu et al.

(10) Patent No.: US 8,951,449 B2
(45) Date of Patent: *Feb. 10, 2015

(54) METHOD FOR PREPARATION OF AQUEOUS NANO-PIGMENT DISPERSION

(75) Inventors: Shi Shu, Beijing (CN); Jiuxia Yang, Beijing (CN); Jisheng Zhao, Beijing (CN); Lin Li, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/643,369

(22) PCT Filed: Jul. 11, 2012

(86) PCT No.: PCT/CN2012/078517
§ 371 (c)(1),
(2), (4) Date: Oct. 25, 2012

(87) PCT Pub. No.: WO2013/007201
PCT Pub. Date: Jan. 17, 2013

(65) Prior Publication Data
US 2013/0099183 A1    Apr. 25, 2013

(30) Foreign Application Priority Data
Jul. 12, 2011  (CN) .......................... 2011 1 0195063

(51) Int. Cl.
*G02B 5/23*     (2006.01)
*C08F 2/44*     (2006.01)
(Continued)

(52) U.S. Cl.
CPC ... *G02B 5/23* (2013.01); *C08F 2/44* (2013.01); *C08F 212/08* (2013.01); *C08F 2/24* (2013.01)
USPC ......... 252/586; 427/163.2; 524/558; 524/562

(58) Field of Classification Search
USPC ............ 252/586; 430/137.15; 521/61, 63, 64, 521/146, 149, 150; 523/201; 524/800, 801, 524/804, 558, 562; 427/163.2
See application file for complete search history.

(56) References Cited

U.S. PATENT DOCUMENTS

| 5,250,576 A | 10/1993 | DesMarais et al. |
| 2002/0128379 A1 | 9/2002 | Hasegawa et al. |

(Continued)

FOREIGN PATENT DOCUMENTS

| CN | 1529740 A | 9/2004 |
| CN | 1690087 A | 11/2005 |

(Continued)

OTHER PUBLICATIONS

International Search Report dated Sep. 13, 2012; PCT/CN2012/078517.

(Continued)

*Primary Examiner* — Bijan Ahvazi
(74) *Attorney, Agent, or Firm* — Ladas & Parry LLP

(57) ABSTRACT

Embodiments of the invention disclose a method for preparing an aqueous nano-pigment dispersion. The method comprises mixing 2.5 wt %~40 wt % styrene with polymerization inhibitors removed by evaporation, 2.5 wt %~20 wt % acrylate monomer, 0.25 wt %~5 wt % crosslinking monomer, 0.05 wt %~0.5 wt % emulsification adjuvant, and 0.05 wt %~0.5 wt % oil soluble initiator, adding 0.25 wt %~2.5 wt % organic pigments to be dispersed to form an oil phase solution after dissolution; dissolving 0.05 wt %~2 wt % emulsifier and 0.05 wt %~2 wt % buffer in 40 wt % wt~90 wt % deionized water to form an aqueous solution; mixing the oil phase solution and the aqueous phase solution, and then homogenizing them into fine emulsion; transferring the fine emulsion into a reactor; heating to increase the temperature to initiate the polymerization; after reacting, adding an alkaline soluble monomer; after continuing the reaction, cooling the temperature to the room temperature; adjusting pH to weak alkaline; and filtering to obtain the aqueous nano-pigment dispersion.

20 Claims, 1 Drawing Sheet

(51) Int. Cl.
*C08F 212/08* (2006.01)
*C08F 2/24* (2006.01)
*B05D 5/06* (2006.01)
*G02B 6/02* (2006.01)

(56) References Cited

U.S. PATENT DOCUMENTS

| | | |
|---|---|---|
| 2004/0171738 A1 | 9/2004 | Harz et al. |
| 2005/0234189 A1 | 10/2005 | Lee et al. |
| 2006/0281834 A1* | 12/2006 | Lee et al. ............... 523/201 |
| 2007/0211126 A1 | 9/2007 | Bauer et al. |
| 2010/0020274 A1 | 1/2010 | Zhang et al. |
| 2012/0315386 A1* | 12/2012 | Shu et al. ............... 427/163.2 |

FOREIGN PATENT DOCUMENTS

| | | | | |
|---|---|---|---|---|
| CN | 1816389 | A | | 8/2006 |
| CN | 101162364 | A | | 4/2008 |
| CN | 101323708 | A | | 12/2008 |
| CN | 101323725 | A | | 12/2008 |
| CN | 101633805 | A | | 1/2010 |
| CN | 101659813 | A | | 3/2010 |
| CN | 101760042 | A | | 6/2010 |
| CN | 101921497 | | * 12/2010 | ............... C09B 67/08 |
| CN | 101921497 | A | | 12/2010 |
| CN | 101955708 | A | | 1/2011 |
| EP | 1 403 343 | A1 | | 3/2004 |
| EP | 1 548 040 | A1 | | 6/2005 |
| EP | 1 788 044 | A1 | | 5/2007 |
| JP | 2005/330298 | A | | 12/2005 |
| JP | 2006-117954 | A | | 5/2006 |
| JP | 2007-162003 | A | | 6/2007 |
| JP | 2009-529443 | A | | 8/2009 |
| KR | 20120137293 | A | | 12/2012 |
| WO | 2010120278 | A1 | | 10/2010 |

OTHER PUBLICATIONS

Hu Zhenkun, et al; "Progress in Preparation and Applications of Nanocolorants", Progress in Chemistry, vol. 18, No. 1, Jan. 2006; 10 pages.
Extended European Search Report dated Oct. 18, 2012; Appln. No. 12171317.6-2102.
First Chinese Office Action dated May 27, 2013; Application No. 201110154188.1.
Second Chinese Office Action dated Nov. 18, 2013; Application No. 201110154188.1.
Korean Patent Office Non-Final Rejection dated Nov. 14, 2013; Application No. 10-2012-0061551.
Korean Patent Office Examination Opinions dated Dec. 20, 2013; Application No. 10-2012-7028551.
International Preliminary Report on Patentability dated Jan. 14, 2014; PCT/CN2012/078517.
Third Chinese Office Action dated Apr. 21, 2014; Appln. No. 201110154188.1.
Korean Examination Opinion dated May 30, 2014; Appln. No. 10-2012-0061551.
USPTO RR dated Apr. 17, 2014 in connection with U.S. Appl. No. 13/491,846.
USPTO NFOA dated Jul. 3, 2014; U.S. Appl. No. 13/491,846.
N. Bechthold, et al; "Miniemulsion Polymerization: Applications and New Materials", Macromol. Symp. vol. 151, pp. 549-555, Article first published online: Nov. 14, 2000.
Franca Tiarks, et al: "Encapsulation of Carbon Black by Miniemulsion Polymerization", Macromol. Chem. Phys., vol. 202, No. 1, pp. 51-60; Article first published online: Jan. 25, 2001.
Korea Notice of Allowance dated Nov. 14, 2014; Appln. No. 10-2012-0061551.

* cited by examiner

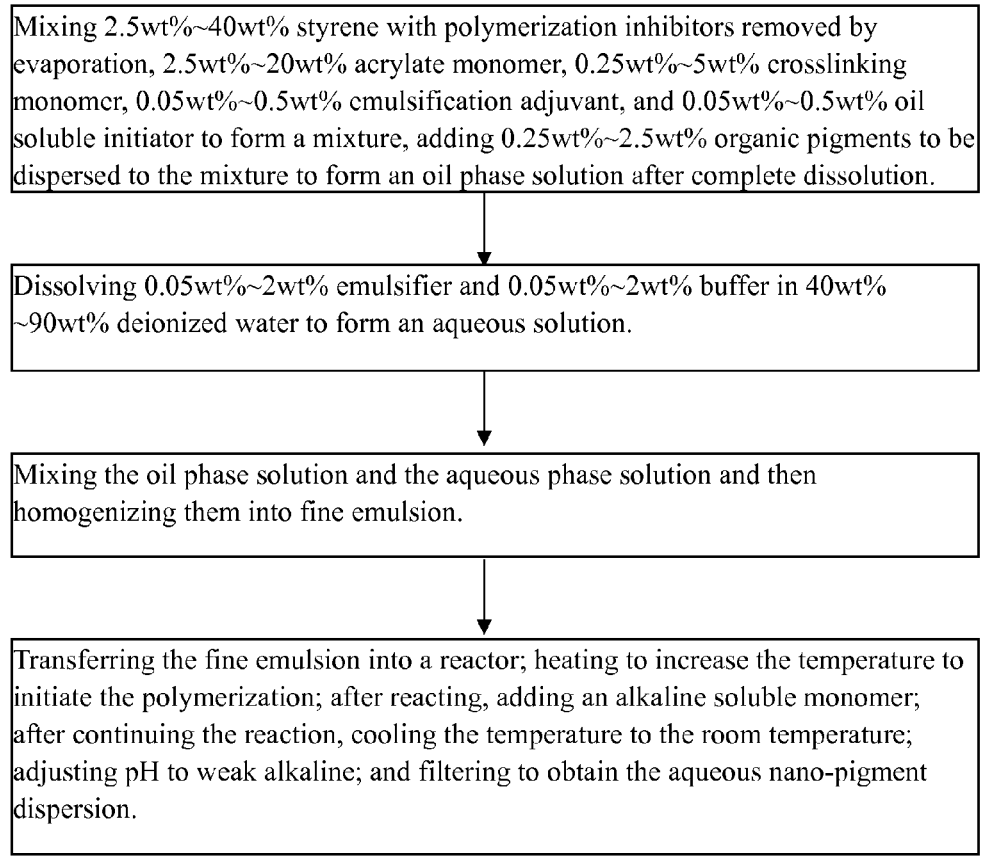

METHOD FOR PREPARATION OF AQUEOUS NANO-PIGMENT DISPERSION

CROSS REFERENCE TO RELATED APPLICATIONS

This application is a national stage application under 35 U.S.C. 371 and claims the benefit of PCT Application No. PCT/CN2012/078517 having an international filing date of Jul. 11, 2012, which designated the United States, which PCT application claimed the benefit of Chinese Application No. 201110195063.3 filed Jul. 12, 2011, the disclosure of each of which are incorporated herein by reference.

TECHNICAL FIELD

Embodiments of the present invention relate to a method for preparing an aqueous nano-pigment dispersion.

BACKGROUND

A color filter is a major component of a liquid crystal display. A liquid crystal display relies on the color filter to exhibit colored images. During the operation of a liquid crystal display, the white light from a backlight is transmitted through a liquid crystal layer to the color filter. After the white light is transmitted through the red, green and blue subpixels of the color filter, red, green and blue light is formed and at last mixed together in human eyes to form colored images.

Conventional methods for manufacturing a color filter include printing, dyeing, pigment dispersion, electro-deposition, dry film method, and spraying that is used for large-sized panels. Currently, the pigment dispersion method is generally used in the industry. The most core process of this method relates to the technique of pigment dispersion. Since color photoresist has very high requirements on pigment particles, the particle sizes of the pigments usually have to be less than 100 nm, and moreover, the particle sizes have to be highly homogenous with a narrow distribution range. Currently, in the pigment dispersion technique, an oil phase solvent is used as the dispersion medium, and a proper dispersant system is chosen for grinding with high power dispersion instrument so as to achieve good dispersion.

In implementing the aforementioned pigment dispersion process with an oil phase solvent as the dispersion medium, the inventors have identified at least the following problems of this traditional technique: employment of a large amount of solvent results in volatile organic compounds (VOC) which is not environmentally friendly; the flammability and explosiveness of the solvent is adverse to workplace safety; and the solvent type color photoresist prepared from a solvent type pigment dispersion in use possesses an inherent deficiency that the viscosity is difficult to adjust exists. To obtain an operable viscosity, the molecular weight of the resin has to be controlled below a certain value, and therefore if the resin has a too high molecular weight, it requires a large amount of active diluent to dilute the resin, but this causes too high a crosslinking density and an increased brittleness of the prepared film, and the prepared film tends to shrink during solidification; if the molecular weight of the resin is too low, the requirement for hardness is difficult to satisfy. This causes an either "soft and flexible" or "hard and brittle" problem of the prepared film.

SUMMARY

Embodiments of the invention provides a method for preparing an aqueous nano-pigment dispersion, which overcomes the defects of solvent type pigment dispersion, and increases the imaging efficiency of the pigment.

An embodiment of the invention provides a method for preparing an aqueous nano-pigment dispersion, comprising:

mixing 2.5 wt %~40 wt % styrene with polymerization inhibitors removed by evaporation, 2.5 wt %~20 wt % acrylate monomer, 0.25 wt %~5 wt % crosslinking monomer, 0.05 wt %~0.5 wt % emulsification adjuvant, and 0.05 wt %~0.5 wt % oil soluble initiator to form a mixture, and adding 0.25 wt %~2.5 wt % organic pigments to be dispersed to the mixture to form an oil phase solution after dissolution;

dissolving 0.05 wt %~2 wt % emulsifier and 0.05 wt %~2 wt % buffer in 40 wt % wt~90 wt % deionized water to form an aqueous solution;

mixing the oil phase solution and the aqueous phase solution and then homogenizing them into fine emulsion; and transferring the fine emulsion into a reactor; heating to increase the temperature to initiate the polymerization; after reacting, adding an alkaline soluble monomer; after continuing the reaction, cooling the temperature to the room temperature; adjusting pH to weak alkaline; and filtering to obtain the aqueous nano-pigment dispersion.

For example, the fine emulsion is transferred into the reactor and heated to increase the temperature to initiate the polymerization; after reacting for 10 min to 40 min, 0.5 wt %~5 wt % alkaline soluble monomer is added therein; after the reaction lasts for 1 hour to 5 hours, the temperature is reduced to the room temperature; pH is adjusted to 8~10; and the aqueous nano-pigment dispersion is obtained by filtering.

For example, the oil phase solution is mixed with the aqueous phase solution and agitated, followed by ultrasonic homogenization to fine emulsion, comprises mixing the oil phase solution with the aqueous phase solution, agitating at 600 rpm~1300 rpm for 15~30 min, and then ultrasonic homogenizing to fine emulsion.

For example, the acrylate monomer is at least two selected from n-butyl acrylate, iso-octyl acrylate, methyl acrylate, ethyl acrylate, methyl methacrylate and ethyl methacrylate.

For example, the crosslinking monomer is at least one selected from ethylene glycol diacrylate, butanediol diacrylate, 1,6~hexanediol diacrylate, tripropylene glycol diacrylate, tetrapropylene glycol diacrylate and trimethylolpropane triacrylate.

For example, the emulsifier is sodium dodecyl sulfate, and the emulsifier adjuvant is at least one selected from cetyl alcohol and cetane.

For example, the oil soluble initiator is at least one selected from benzoyl peroxide and azobisisobutyronitrile.

For example, the buffer is sodium bicarbonate.

For example, the alkaline soluble monomer is at least one selected from acrylic acid, methacrylic acid, hydroxyethyl acrylate, hydroxyethyl methacrylate, hydroxypropyl acrylate and hydroxypropyl methacrylate.

For example, the heating to increase the temperature is by aerating nitrogen gas to a temperature of 60° C.~90° C.

For example, the heating to increase the temperature is by aerating nitrogen gas to a temperature of 70° C.~80° C.

Compared to the conventional technique, the embodiment of the invention employs fine emulsion polymerization method to prepare an aqueous pigment dispersoid, and a pigment dispersoid with a particle size less than 100 nm and a coefficient of dispersion less than 0.1 is prepared, which satisfies the requirements for color photoresist.

BRIEF DESCRIPTION OF THE DRAWINGS

In order to further illustrate the embodiments of the invention or embodiments in the prior art, the figure used in the embodiments is briefly introduced. Apparently, the figure below is merely related to a portion of the embodiments of the invention. A person skilled in the art may obtain other figures based on this figure without any creative work.

FIG. 1 is a low chart of the method for preparation of the aqueous nano-pigment dispersion of an embodiment of the invention.

DETAILED DESCRIPTION

The technical solutions of the embodiments of the invention are described in a clear and complete manner below in connection with the accompanying figure. Apparently, the described embodiments are merely a portion of the embodiments, rather than all embodiments, of the invention. Any other embodiments obtained by a person skilled in the art without creative work should fall into the scope of the invention.

Embodiment 1

This embodiment of the invention provides a method for preparing an aqueous nano-pigment dispersion. As shown in FIG. 1, the method comprises the following steps.

Step 101. Mixing 2.5 wt %~40 wt % styrene with polymerization inhibitors removed by evaporation, 2.5 wt %~20 wt % acrylate monomer, 0.25 wt %~5 wt % crosslinking monomer, 0.05 wt %~0.5 wt % emulsification adjuvant, and 0.05 wt %~0.5 wt % oil soluble initiator to form a mixture, adding 0.25 wt %~2.5 wt % organic pigments to be dispersed to the mixture to form an oil phase solution after complete dissolution.

In order to realize the dispersion of organic pigments in an aqueous phase, the oil phase solution, for example, is dispersed into the aqueous phase solution that is prepared in the following steps at a nano level to form droplets with a particle size less than 100 nm. Styrene and acrylate monomer are used in this embodiment of the invention to dissolve the pigments. The acrylate monomer employed includes for example at least two selected from n-butyl acrylate, iso-octyl acrylate, methyl acrylate, ethyl acrylate, methyl methacrylate and ethyl methacrylate. After the pigments are dissolved in the solution composed of styrene and the acrylate monomer, the solution is aqueously homogenized into fine emulsion under the action of the emulsifier and the emulsifier adjuvant. Moreover, the non-polar styrene is distributed in the interior of droplets, and the high polar acrylate monomer is distributed to the shell of the droplets. This kind of distribution facilitates the distribution of pigment particles in the interior of the droplets. Subsequently the pigment particles can be fixed by proper crosslinking between the styrene inside the droplets and the acrylate monomer in the surface layer of the droplets to prevent the migration and aggregation of the pigment particles. Styrene with polymerization inhibitors removed by evaporation is styrene purified through evaporation by removing polymerization inhibitors that are possibly included therein.

The crosslinking monomers used in the embodiment of the invention includes for example at least one selected from ethylene glycol diacrylate, butanediol diacrylate, 1,6-hexanediol diacrylate, tripropylene glycol diacrylate, tetrapropylene glycol diacrylate and trimethylolpropane triacrylate. These crosslinking monomers have slightly long chains, and their chain segments tend to be flexible, which will not cause the incompletion of the crosslinking reaction due to too hard chain segments.

To further stabilize the formed fine emulsion particles and make the particle size of the dispersoid small enough and evenly distributed, an emulsifier adjuvant is introduced in the oil phase solution in the embodiment of the invention. The emulsifier adjuvant employed here is for example at least one selected from cetyl alcohol and cetane.

In order to increase the stability of the distribution system in the embodiment of the invention, polymerization is initiated inside the droplets by employing an oil soluble initiator. The oil soluble initiator employed here is for example at least one selected from benzoyl peroxide and azobisisobutyronitrile. This oil soluble initiator avoids the following disadvantages of a water soluble initiator in an aqueous phase: a water soluble initiator will initiate the polymerization of the acrylate monomer and the crosslinking monomer to form polymer chain segments in the aqueous phase; moreover, the water soluble initiator will initiate the polymerization of an alkali-soluble monomer to form a water soluble oligomer in the aqueous phase, and the stability of the whole distribution system will be disrupted by bridging effect by the polymer chain segment and the water soluble oligomer; and the polymerization of the alkaline soluble monomer into the water soluble oligomer may cause the failure of introducing the alkaline soluble group onto the surface of the pigment dispersoid, which renders the alkaline soluble group incapable of serving its role of increasing the imaging efficiency.

Step 102. Dissolving 0.05 wt %~2 wt % emulsifier and 0.05 wt %~2 wt % buffer in 40 wt %~90 wt. % deionized water to form an aqueous solution.

In the embodiment of the invention, the mixing of the oil phase solution and the aqueous phase solution to form fine emulsion is conducted by adding an emulsifier to the aqueous phase solution; the emulsifier is for example sodium dodecyl sulfate.

The buffer is added into the aqueous phase solution in the embodiment of the invention to maintain a stable pH value. The buffer employed is for example sodium bicarbonate.

Step 103. Mixing the oil phase solution and the aqueous phase solution and then homogenizing them into fine emulsion.

The oil phase solution and the aqueous phase solution are mixed and agitated, for example, at the agitation rate of 600 rpm~1300 rpm, for example, for the agitation time of 15~30 min; after the agitation, the mixture is homogenized into fine emulsion. The method of homogenization is for example ultrasonic homogenization.

Step 104. Transferring the fine emulsion into a reactor; heating to increase the temperature to initiate the polymerization; after reacting, adding an alkaline soluble monomer; after continuing the reaction, cooling the temperature to the room temperature; adjusting pH to weak alkaline; and filtering to obtain the aqueous nano-pigment dispersion.

For example, the fine emulsion is transferred into a reactor and heated to increase the temperature to initiate the polymerization; after reacting for 10 min to 40 min, 0.5 wt %~5 wt % alkaline soluble monomer is added therein; after the reaction lasts for 1 hour to 5 hours, the temperature is reduced to the room temperature; pH is adjusted to 8~10; and the aqueous nano-pigment dispersion can be obtained by filtering.

In the above process, for example, nitrogen gas is aerated for heating, and the temperature to be reached is 60° C.~90° C., preferably 70° C.~80° C. pH is adjusted to weak alkaline by for example aqueous ammonia.

An alkaline soluble monomer is introduced in the embodiment of the invention to render the pigment dispersion alkaline soluble, so that the imaging efficiency of the dispersion is increased. The used alkaline soluble monomer is for example at least one selected from acrylic acid, methacrylic acid, hydroxyethyl acrylate, hydroxyethyl methacrylate, hydroxypropyl acrylate and hydroxypropyl methacrylate. The traditional method is to add an alkaline soluble resin to render the photoresist alkaline solubility. However, the alkaline soluble resin has a high carboxyl level and a high polarity of its chain segments, which causes the poor compatibility between the alkaline soluble resin and the low polarity pigment dispersion system. Therefore, frequently the alkaline soluble resin is peeled off after being washed with an alkaline solution, but there a small amount of pigments remain, which results in the color filter that cannot be used. Therefore, in the embodiment of the invention, alkaline soluble groups are introduced into the surface of the pigment dispersoid, which overcomes the defects of the traditional methods and can effectively avoid the adverse effect caused by remnants after washing with the alkaline solution.

The pigments employed in the embodiment of the invention is for example one of red pigments, yellow pigments, orange pigments, green pigments, blue pigments, purple pigments, etc., or the mixture of two or more pigments mentioned above. Among the pigments, the red pigments are for example perylene, quinacridone, pyrrole, and primarily pyrroles such as P.R.224, P.R.254, P.R.255, P.R.264, P.R.122, P.R.123, P.R.177, P.R.179, P.R.190, P.R.202, P.R.210, P.R.270, P.R.272, P.R.122, etc. The yellow pigments are for example azos, and heterocycles such as P.Y.1, P.Y.12, P.Y.3, P.Y.13, P.Y.83, P.Y.93, P.Y.94, P.Y.95, P.Y.109, P.Y.126, P.Y.127, P.Y.138, P.Y.139, P.Y.147, P.Y.150, P.Y.174, etc. The orange pigments are for example azo pigments, pyrrolidone pigments, and benzidine pigments such as P.O.5, P.O.13, P.O.16, P.O.34, P.O.36, P.O.48, P.O.49, P.O.71, P.O.73, etc. The green pigments are for example P.G.37, P.G.36, P.G.7, etc. The blue pigments are for example P.B.1, P.B.2, P.B.15, P.B.15:3, P.B.15:4, P.B.15:6, P.B.16, P.B.22, P.B.60, P.B.66, etc. The purple pigments are for example P.V.32, P.V.36, P.V.38, P.V.39, P.V.23, P.V.9, P.V.1, etc.

Compared to the conventional techniques, because the embodiment of the invention employs fine emulsion polymerization method to prepare an aqueous pigment dispersoid, a pigment dispersoid with a particle size less than 100 nm and a coefficient of dispersion less than 0.1 can be prepared, which satisfies the requirements for a color photoresist.

In the embodiment of the invention which involves proper crosslinking between the interior and the surface of the emulsoid particles in the fine emulsion, the migration of the pigment particles within the emulsoid particles or even outward to the aqueous phase is prevented, which ensures the excellent color property of the pigments.

An oil soluble initiator is used in the embodiment of the invention to initiate the polymerization. Compared with the traditional water soluble initiator, this fundamentally prevents the initiation of the monomers in the aqueous phase and avoids the aqueous phase low molecular oligomers from disrupting the stability of the pigment dispersoid.

In the embodiment of the invention, alkaline soluble groups are introduced onto the surface of the emulsoid particles, which improves the imaging efficiency of the pigments and prevents the adverse effects caused by remnants after washing with the alkaline solution.

The adjustment of viscosity of the aqueous color photoresist formed from the aqueous pigment dispersion prepared in the embodiment of the invention is not necessary to resort to active diluents. The adjustment can be done with water and cellulose ether thickeners as required. This reduces the difficulty of adjusting the viscosity compared to the traditional solvent type pigment dispersion, and also overcomes the defects of the traditional solvent type pigment dispersion such as non-environmentally friendly, flammability and imperfect coating property, etc.

EXAMPLE 1

The Example 1 of the method for preparing the aqueous nano-pigment dispersion of the embodiment of the invention comprises the following steps.

30 g styrene with polymerization inhibitors removed by evaporation, 10 g n-butyl acrylate, 5 g methyl methacrylate, 1.3 g 1,6-hexanediol diacrylate, 1.7 g tetraethylene glycol diacrylate, 1 g cetyl alcohol, and 0.5 g benzoyl peroxide are mixed to form a mixture, and 1.8 g organic pigments to be dispersed is then added to the above mixture to form an oil phase solution after complete dissolution.

To realize the dispersion of the organic pigments in the aqueous phase and disperse the oil phase solution into the aqueous phase solution prepared in the following steps at a nano level to form droplets a with particle size less than 100 nm, styrene, n-butyl acrylate monomer and methyl methacrylate monomer are used in the example to dissolve pigments.

The example employs 1,6-hexanediol diacrylate and tetrapropylene glycol diacrylate as crosslinking monomers. These crosslinking monomers have slightly long chains, and their chain segments tend to be flexible, which will not cause the incompletion of the crosslinking reaction due to too hard chain segments.

The example employs cetyl alcohol as the emulsifier adjuvant to further stabilize the formed fine emulsion and make the particle size of the dispersoid small enough and evenly distributed.

In the example, in order to increase the stability of the distribution system, polymerization is initiated inside the droplets by employing the oil soluble initiator, benzoyl peroxide. The oil soluble initiator, benzoyl peroxide, avoids the following disadvantages of a water soluble initiator in an aqueous phase: a water soluble initiator will initiate the polymerization of the acrylate monomer and the crosslinking monomer to form polymer chain segments in the aqueous phase; moreover, the water soluble initiator will also initiate the polymerization of an alkali-soluble monomer to form a water soluble oligomer in the aqueous phase, and the stability of the whole distribution system will be disrupted by bridging effect by the polymer chain segment and the water soluble oligomer; and the polymerization of the alkaline soluble monomer into the water soluble oligomer may cause the failure of introducing the alkaline soluble group onto the surface of the pigment dispersoid, which renders the alkaline soluble group incapable of serving its role of increasing the imaging efficiency.

After pigments are dissolved in the solution composed of styrene, n-butyl acrylate monomer and methyl methacrylate monomer, the solution is aqueously homogenized into fine emulsion under the action of the emulsifier, sodium dodecyl sulfate, and the emulsifier adjuvant, cetyl alcohol. Moreover, the non-polar styrene is distributed in the interior of the droplets, and the high polar n-butyl acrylate monomer and methyl methacrylate monomer are distributed to the shell of the droplets. This kind of distribution facilitates the distribution of pigment particles in the interior of the droplets, and subsequently the pigment particles can be fixed by proper crosslinking between the styrene inside the droplets and the n-butyl acrylate monomer and methyl methacrylate monomer in the surface layer to prevent the migration and aggregation of the pigment particles.

Next, 3 g sodium dodecyl sulfate and 2.2 g NaHCO3 are dissolved in 120 g deionized water to form an aqueous solution.

In the example, the mixing of the oil phase solution and the aqueous phase solution to form a fine dispersion is conducted by adding the emulsifier, sodium dodecyl sulfate, into the aqueous phase solution.

In the example, the stable pH of the solution is maintained by adding the buffer sodium bicarbonate into the aqueous phase solution.

The oil phase solution prepared as described above is mixed with the aqueous phase solution, agitated at 800 rpm for 15 min, and transferred into an ultrasonic homogenizer for ultrasonic homogenization to form fine emulsion.

The fine emulsion is transferred into a reactor and heated to 80° C. with aerating with nitrogen gas, which initiates the polymerization reaction. After reacting for 12 min, 4 g methacrylic acid and 2 g hydroxyethyl methacrylate are added and the reaction is continued for another 3 h, followed by cooling to the room temperature. The obtained solution is adjusted for example by aqueous ammonia to pH=9, and then filtered to obtain the aqueous nano-pigment dispersion.

In the example, the alkaline soluble monomers, methacrylic acid and hydroxyethyl methacrylate, are introduced to render the pigment dispersion alkaline soluble, so as to increase the imaging efficiency of the dispersion. The traditional method is to add an alkaline soluble resin to render the photoresist alkaline solubility. However, the alkaline soluble resin has a high carboxyl level and a high polarity of its chain segments, which causes the poor compatibility between the alkaline soluble resin and the low polarity pigment dispersion system. Therefore, frequently the alkaline soluble resin is peeled off after being washed with an alkaline solution, but there a small amount of pigments remain, which results in the color filter that cannot be used. Therefore, in the example of the invention, alkaline soluble groups are introduced onto the surface of the pigment dispersoid, which overcomes the defects of the traditional methods and can effectively avoid the adverse effect caused by remnants after washing with the alkaline solution.

Compared to the prior art, because the example employs fine emulsion polymerization method to prepare an aqueous pigment dispersoid, a pigment dispersoid with a particle size less than 100 nm and a coefficient of dispersion less than 0.1 can be prepared, which satisfies the requirements for a color photoresist.

In the example which involves proper crosslinking between the interior and the surface of the emulsoid particles in the fine emulsion, the migration of the pigment particles within the emulsoid particles or even outward to the aqueous phase is prevented, which ensures the excellent color property of the pigments.

The oil soluble initiator, benzoyl peroxide, is used in the example to initiate the polymerization. Compared with the traditional water soluble initiator, this fundamentally prevents the initiation of the monomers in the aqueous phase and avoids the aqueous phase low molecular oligomers from disrupting the stability of the pigment dispersoid.

In the example, the alkaline soluble monomers, methacrylate and hydroxyethyl methacrylate, are introduced onto the surface of the emulsoid particles, which improves the imaging efficiency of the pigments and prevents the adverse effects caused by remnants after washing with the alkaline solution.

The adjustment of viscosity of the aqueous color photoresist formed from the aqueous pigment dispersion prepared in the example is not necessary to resort to active diluents. The adjustment can be done with water and cellulose ether thickeners as required. This reduces the difficulty of adjusting the viscosity compared to the traditional solvent type pigment dispersion, and also overcomes the defects of the traditional solvent type pigment dispersion such as non-environmentally friendly, flammability and imperfect coating property, etc.

EXAMPLE 2

The Example 2 of the method for preparing the aqueous nano-pigment dispersion of the embodiment of the invention comprises the following steps.

26 g styrene with polymerization inhibitors removed by evaporation, 10 g methyl methacrylate, 5 g iso-octyl methacrylate, 1.5 g 1,6-hexanediol diacrylate, 1.5 g tetraethylene glycol diacrylate, 0.8 g cetyl alcohol, 0.2 g cetane, and 0.5 g azobisisobutyronitrile are mixed to form a mixture, and 1.6 g organic pigments to be dispersed is then added to the above mixture to form an oil phase solution after complete dissolution.

To realize the dispersion of the organic pigments in the aqueous phase and disperse the oil phase solution into the aqueous phase solution prepared in the following steps at a nano level to form droplets a with particle size less than 100 nm, styrene, methyl methacrylate monomer and iso-octyl acrylate monomer are used in the example to dissolve pigments.

The example employs 1,6-hexanediol diacrylate and tetrapropylene glycol diacrylate as crosslinking monomers. These crosslinking monomers have slightly long chains, and their chain segments tend to be flexible, which will not cause the incompletion of the crosslinking reaction due to too hard chain segments.

The example employs cetyl alcohol and cetane as the emulsifier adjuvants to further stabilize the formed fine emulsion and make the particle size of the dispersoid small enough and evenly distributed.

In the example, in order to increase the stability of the distribution system, polymerization is initiated inside the droplets by employing the oil soluble initiator azobisisobutyronitrile. The oil soluble initiator, azobisisobutyronitrile, avoids the following disadvantages of a water soluble initiator in an aqueous phase: a water soluble initiator will initiate the polymerization of the acrylate monomer and the crosslinking monomer to form polymer chain segments in the aqueous phase; moreover, the water soluble initiator will also initiate the polymerization of an alkali-soluble monomer to form a water soluble oligomer in the aqueous phase, and the stability of the whole distribution system will be disrupted by bridging effect by the polymer chain segment and the water soluble oligomer; and the polymerization of the alkaline soluble monomer into the water soluble oligomer may cause the failure of introducing the alkaline soluble group onto the surface of the pigment dispersoid, which renders the alkaline soluble group incapable of serving its role of increasing the imaging efficiency.

After pigments are dissolved in the solution composed of styrene, methyl methacrylate monomer and iso-octyl acrylate monomer, the solution is aqueously homogenized into fine emulsion under the action of the emulsifier, sodium dodecyl sulfate, and the emulsifier adjuvants, cetyl alcohol and cetane. Moreover, the non-polar styrene is distributed in the interior of the droplets, and the high polar methyl methacrylate monomer and iso-octyl acrylate monomer are distributed to the shell of the droplets. This kind of distribution facilitates the distribution of pigment particles in the interior of the droplets. Subsequently, the pigment particles can be fixed by proper crosslinking between the styrene inside the droplets and the methyl methacrylate monomer and iso-octyl acrylate monomer in the surface layer to prevent the migration and aggregation of the pigment particles.

3 g sodium dodecyl sulfate and 2.2 g NaHCO3 are dissolved in 120 g deionized water to form an aqueous solution.

In the example, the mixing of the oil phase solution and the aqueous phase solution to form a fine dispersion is conducted by adding the emulsifier, sodium dodecyl sulfate, into the aqueous phase solution.

In the example, the stable pH of the solution is maintained by adding the buffer, sodium bicarbonate, into the aqueous phase solution.

The oil phase solution prepared as described above is mixed with the aqueous phase solution, agitated at 800 rpm for 15 min, and transferred into an ultrasonic homogenizer for ultrasonic homogenization to form fine emulsion.

The fine emulsion is transferred into a reactor and heated to 80° C. with aerating with nitrogen gas, which initiates the polymerization reaction. After reacting for 12 min, 4 g methacrylic acid and 2 g hydroxypropyl methacrylate are added and the reaction is continued for another 3 h, followed by cooling to the room temperature. The obtained solution is adjusted for example by aqueous ammonia to pH=9, and then filtered to obtain the aqueous nano-pigment dispersion.

In the example, the alkaline soluble monomers, methacrylic acid and hydroxypropyl methacrylate, is introduced to render the pigment dispersion alkaline soluble, so as to increase the imaging efficiency of the dispersion. The traditional method is to add an alkaline soluble resin to render the photoresist alkaline solubility. However, the alkaline soluble resin has a high carboxyl level and a high polarity of its chain segments, which causes the poor compatibility between the alkaline soluble resin and the low polarity pigment dispersion system. Therefore, frequently the alkaline soluble resin is peeled off after being washed with an alkaline solution, but there a small amount of pigments remain, which results in the color filter that cannot be used. Therefore, in the example of the invention, alkaline soluble groups are introduced on the surface of the pigment dispersoid, which overcomes the defects of the traditional methods and can effectively avoid the adverse effect caused by remnants after washing with the alkaline solution.

Compared to the prior art, because the example employs fine emulsion polymerization method to prepare an aqueous pigment dispersoid, a pigment dispersoid with a particle size less than 100 nm and a coefficient of dispersion less than 0.1 is prepared, which satisfies the requirements for a color photoresist.

In the example which involves proper crosslinking between the interior and the surface of the emulsoid particles in the fine emulsion, the migration of the pigment particles within the emulsoid particles or even outward to the aqueous phase is prevented, which ensures the excellent color property of the pigments.

The oil soluble initiator, azobisisobutyronitrile, is used in the example to initiate the polymerization. Compared with the traditional water soluble initiator, this fundamentally prevents the initiation of the monomers in the aqueous phase and avoids the aqueous phase low molecular oligomers from disrupting the stability of the pigment dispersoid.

In the example, the alkaline soluble monomers, methacrylate and hydroxypropyl methacrylate, are introduced onto the surface of the emulsoid particles which improves the imaging efficiency of the pigments and prevents the adverse effects caused by remnants after washing with the alkaline solution.

The adjustment of viscosity of the aqueous color photoresist formed from the aqueous pigment dispersion prepared in the example is not necessary to resort to active diluents. The adjustment can be done with water and cellulose ether thickeners as required. This reduces the difficulty of adjusting the viscosity compared to the traditional solvent type pigment dispersion, and also overcomes the defects of the traditional solvent type pigment dispersion such as non-environmentally friendly, flammability and imperfect coating property, etc.

The above is merely specific embodiments of the invention. The scope of the invention, however, is not limited thereto. Any person skilled in the art can easily conceive of alterations and modifications within the disclosure of the invention, which are encompassed by the scope of the invention. Therefore, the scope of the invention is defined by the claims.

The invention claimed is:

1. A method for preparing an aqueous nano-pigment dispersion comprising:
    mixing 2.5 wt %-40 wt % styrene with polymerization inhibitors removed by evaporation, 2.5 wt %-20 wt % acrylate monomer, 0.25 wt %-5 wt % crosslinking monomer, 0.05 wt %-0.5 wt % emulsification adjuvant, selected from the group consisting of cetyl alcohol and cetane, and 0.05 wt %-0.5 wt % oil soluble initiator to form a mixture, and adding 0.25 wt %-2.5 wt % organic pigments to be dispersed to the mixture to form an oil phase solution after dissolution;
    dissolving 0.05 wt %-2 wt % emulsifier and 0.05 wt %-2 wt % buffer in 40 wt %-90 wt % deionized water to form an aqueous solution;
    mixing the oil phase solution and the aqueous phase solution and then homogenizing them into fine emulsion; and
    transferring the fine emulsion into a reactor; heating to increase the temperature to initiate the polymerization; after reacting, adding an alkaline soluble monomer; after continuing the reaction, cooling the temperature to the room temperature; adjusting pH to weak alkaline; and filtering to obtain the aqueous nano-pigment dispersion.

2. The method according to claim 1, wherein the acrylate monomer includes at least two selected from the group consisting of n-butyl acrylate, iso-octyl acrylate, methyl acrylate, ethyl acrylate, methyl methacrylate and ethyl methacrylate.

3. The method according to claim 2, wherein the crosslinking monomer is at least one selected from ethylene glycol diacrylate, butanediol diacrylate, 1,6-hexanediol diacrylate, tripropylene glycol diacrylate, tetrapropylene glycol diacrylate and trimethylolpropane triacrylate.

4. The method according to claim 2, wherein mixing the oil phase solution with the aqueous phase solution and then homogenizing them into fine emulsion comprises:
    mixing the oil phase solution with the aqueous phase solution, agitating at 600 rpm-1300 rpm for 15-30 min, and then ultrasonic homogenizing to fine emulsion.

5. The method according to claim 1, wherein the crosslinking monomer is at least one selected from the group consisting of ethylene glycol diacrylate, butanediol diacrylate, 1,6-hexanediol diacrylate, tripropylene glycol diacrylate, tetrapropylene glycol diacrylate and trimethylolpropane triacrylate.

6. The method according to claim 5, wherein the emulsifier is sodium dodecyl sulfate.

7. The method according claim 5, wherein mixing the oil phase solution with the aqueous phase solution and then homogenizing them into fine emulsion comprises:
    mixing the oil phase solution with the aqueous phase solution, agitating at 600 rpm-1300 rpm for 15-30 min, and then ultrasonic homogenizing to fine emulsion.

8. The method according to claim 1, wherein the emulsifier is sodium dodecyl sulfate, and the emulsification adjuvant is at least one selected from the group consisting of cetyl alcohol and cetane.

9. The method according to claim 8, wherein the oil soluble initiator is at least one selected from benzoyl peroxide and azobisisobutyronitrile.

10. The method according to claim 8, wherein the alkaline soluble monomer is at least one selected from the group consisting of acrylic acid, methacrylic acid, hydroxyethyl acrylate, hydroxyethyl methacrylate, hydroxypropyl acrylate or hydrocypropyl methacrylate.

11. The method according to claim 8, wherein the fine emulsion is transferred into the reactor and heated to increase the temperature to initiate the polymerization; after reacting for 10 min to 40 min, 0.5 wt %-5 wt % alkaline soluble monomer is added therein; after the reaction lasts for 1 hour to 5 hours, the temperature is reduced to the room temperature; pH is adjusted to 8-10; and the aqueous nano-pigment dispersion is obtained by filtering.

12. The method according to claim 8, wherein heating to increase the temperature is conducted by aerating nitrogen gas to a temperature of 60° C.-90° C.

13. The method according to claim 1, wherein the oil soluble initiator is at least one selected from the group consisting of benzoyl peroxide and azobisisobutyronitrile.

14. The method according to claim 13, wherein the buffer is sodium bicarbonate.

15. The method according to claim 1, wherein the buffer is sodium bicarbonate.

16. The method according to claim 1, wherein the alkaline soluble monomer is at least one selected from the group consisting of acrylic acid, methacrylic acid, hydroxyethyl acrylate, hydroxyethyl methacrylate, hydroxypropyl acrylate or hydrocypropyl methacrylate.

17. The method according to claim 8, wherein the fine emulsion is transferred into the reactor and heated to increase the temperature to initiate the polymerization; after reacting for 10 min to 40 min, 0.5 wt %-5 wt % alkaline soluble monomer is added therein; after the reaction lasts for 1 hour to 5 hours, the temperature is reduced to the room temperature; pH is adjusted to 8-10; and the aqueous nano-pigment dispersion is obtained by filtering.

18. The method according to claim 1, wherein heating to increase the temperature is conducted by aerating nitrogen gas to a temperature of 60° C.-90° C.

19. The method according to claim 18, wherein heating to increase the temperature is conducted by aerating nitrogen gas to a temperature of 70° C.-80° C.

20. The method according to claim 1, wherein mixing the oil phase solution with the aqueous phase solution and then homogenizing them into fine emulsion comprises:
mixing the oil phase solution with the aqueous phase solution, agitating at 600 rpm-1300 rpm for 15-30 min, and then ultrasonic homogenizing to fine emulsion.

* * * * *